US011054393B2

(12) United States Patent
Oguchi et al.

(10) Patent No.: US 11,054,393 B2
(45) Date of Patent: Jul. 6, 2021

(54) INSPECTION DEVICE, INSPECTION METHOD AND NON-CONTACT SENSOR

(71) Applicants: NAGANO PREFECTURAL GOVERNMENT, Nagano (JP); Komatsu Seiki Kosakusho Co., Ltd., Suwa (JP)

(72) Inventors: Keigo Oguchi, Okaya (JP); Takafumi Komatsu, Suwa (JP)

(73) Assignees: NAGANO PREFECTURAL GOVERNMENT, Nagano (JP); KOMATSU SEIKI KOSAKUSHO CO., LTD., Suwa (JP)

( * ) Notice: Subject to any disclaimer, the term of this patent is extended or adjusted under 35 U.S.C. 154(b) by 360 days.

(21) Appl. No.: 16/084,028

(22) PCT Filed: Oct. 13, 2016

(86) PCT No.: PCT/JP2016/080453
§ 371 (c)(1),
(2) Date: Sep. 11, 2018

(87) PCT Pub. No.: WO2017/158898
PCT Pub. Date: Sep. 21, 2017

(65) Prior Publication Data
US 2020/0292498 A1    Sep. 17, 2020

(30) Foreign Application Priority Data

Mar. 18, 2016   (JP) ............................. JP2016-056194

(51) Int. Cl.
*G01N 27/82* (2006.01)
(52) U.S. Cl.
CPC .................................. *G01N 27/82* (2013.01)
(58) Field of Classification Search
CPC ............................. G01N 27/82; G01N 29/00
See application file for complete search history.

(56) References Cited

U.S. PATENT DOCUMENTS

| 5,210,492 A | 5/1993 | Hosohara et al. |
| 5,519,316 A | 5/1996 | Hagiwara et al. |
| 2012/0019236 A1* | 1/2012 | Tiernan ................ G01R 33/096 324/234 |

FOREIGN PATENT DOCUMENTS

| EP | 2574912 A1 | 4/2013 |
| EP | 2847582 A1 | 3/2015 |

(Continued)

OTHER PUBLICATIONS

Extended (Supplementary) European Search Report dated Jan. 9, 2020, issued in counterpart EP application No. 16894515.2. (4 pages).

(Continued)

*Primary Examiner* — Minh Q Phan
(74) *Attorney, Agent, or Firm* — Westerman, Hattori, Daniels & Adrian, LLP

(57) ABSTRACT

A non-contact sensor is disclosed wherein magnetic circuits are constituted by an excitation coil, a first detection coil, and a second detection coil, and the first detection coil and the second detection coil are configured so as to be symmetrical with each other in terms of the magnetic circuits. An inspection system includes: a first input unit to which a signal from the first detection coil is input; a second input unit to which a signal from the second detection coil is input; a difference calculating unit that calculates a difference between a first signal from the first input unit and a second signal from the second input unit; a signal processing unit that processes a difference signal calculated by the difference calculating unit; and an oscillation unit that generates an excitation signal for the excitation coil and a reference signal for the signal processing unit.

10 Claims, 7 Drawing Sheets

(56) References Cited

FOREIGN PATENT DOCUMENTS

| JP | 60-61655 | A | 4/1985 |
| --- | --- | --- | --- |
| JP | 60-95304 | A | 5/1985 |
| JP | 61-58 | U | 1/1986 |
| JP | 7-175315 | A | 7/1995 |
| JP | 7-43650 | Y2 | 10/1995 |
| JP | 8-160005 | A | 6/1996 |
| JP | 10-206394 | A | 8/1998 |
| JP | 2008-102073 | A | 5/2008 |
| JP | 2014-513296 | A | 5/2014 |

OTHER PUBLICATIONS

Javier Garica-Martin et al., "Non-destructive techniques based on eddy current testing", Sensors, (2011), vol. 11, No. 3, pp. 2525-2565, cited in Extended European Search Report dated Jan. 9, 2020. (42 pages).

International Search Report dated Jan. 17, 2017, issued in counterpart application No. PCT/JP2016/080453. (2 pages).

Hoshikawa et al., "Eddy current inspection, Recent trend of eddy current inspection", Inspection Engineering, 2004, vol. 9, No. 1, pp. 1-5, cited in Specification (8 pages), with concise explanation of relevance.

Hiroshima et al., "Eddy current inspection, Inspection of welded part and mechanical parts using a θ probe", Inspection Engineering, 2004, vol. 9, No. 1, pp. 10-14, cited in Specification (6 pages), with concise explanation of relevance.

Koido, "Eddy current inspection, Rebar inspection using electromagnetic induction", Inspection Engineering, 2004, vol. 9, No. 1, pp. 15-19, cited in Specification (6 pages), with concise explanation of relevance.

Hashimoto, "Eddy current inspection, Current state of analysis technology in eddy current inspection", Inspection Engineering, 2004, vol. 9, No. 1, pp. 6-9, cited in Specification (5 pages), with concise explanation of relevance.

Hoshikawa et al., "Eddy Current and Magnetic Flux Leakage Testing of Magnetic Material by Uniform Eddy Current Probe", Non-Destructive Inspection, 2005, vol. 54, No. 2, pp. 84-90, cited in Specification (8 pages), with concise explanation of relevance.

\* cited by examiner

INSPECTION DEVICE, INSPECTION METHOD AND NON-CONTACT SENSOR

TECHNICAL FIELD

The present invention relates to an inspection device and an inspection method that allow inspections to be performed simply and with high sensitivity, and a non-contact sensor used for the same.

BACKGROUND ART

As a non-contact inspection technology, the eddy current inspection, which feeds the eddy current to an object to be tested, thereby detecting the change in the eddy current as a change in the tested coil, is known. If the distance between the tested coil and the object to be tested (liftoff) changes, a big noise is generated, inhibiting inspection, which is why a two-dimensional inspection probe (Patent literature 1) and θ probe (Patent literature 2) have been developed. Also, by using the rebar inspection method capitalizing on electromagnetic induction, various information such as cover and diameter can be obtained (Patent literature 3).

CITATION LIST

Non-Patent Literature

Non-patent Literature 1: H. Hoshikawa, Feature article: Eddy current inspection, Recent trend of eddy current inspection, Inspection Engineering, Vol. 9, No. 1, pp. 1 to 5, published on Jan. 1, 2004

Non-patent Literature 2: T. Hiroshima, T, Fujimoto, S. Matsunaga, Feature article: Eddy current inspection, Inspection of welded part and mechanical parts using a θ probe, Inspection Engineering, Vol. 9, No. 1, pp. 10 to 14, published on Jan. 1, 2004

Non-patent Literature 3: J. Koido, Feature article: Eddy current inspection, Rebar inspection using electromagnetic induction, Inspection Engineering, Vol. 9, No. 1, pp. 15 to 19, published on Jan. 1, 2004

Non-patent Literature 4: M. Hashimoto, Feature article: Eddy current inspection, Current state of analysis technology in eddy current inspection, Inspection Engineering, Vol. 9, No. 1, pp. 6 to 9, published on Jan. 1, 2004

Non-patent Literature 5: H. Hoshikawa, K. Ogawa, S. Mitsuhashi, Eddy Current and Magnetic Flux Leakage Testing of Magnetic Material by Uniform Eddy Current Probe, Non-Destructive Inspection, Vol. 54, No. 2, February 2005

SUMMARY OF INVENTION

Technical Problem

With these technologies, it is impossible to judge the presence or absence of various substances, or whether the object to be inspected is different from a reference standard substance or not in a highly sensitive and easy way.

The objective of the present invention is to provide an inspection device and an inspection method that allow the presence or absence of an object, its difference from a reference standard substance, etc. to be inspected highly sensitively and easily, as well as a non-contact sensor used for the inspection.

Solution to Problem

The concept of the present invention is as follows:

[1] An inspection device to which a non-contact sensor is to be mounted, the non-contact sensor including: an excitation coil; a first detection coil; and a second detection coil, the excitation coil, the first detection coil, and the second detection coil constituting magnetic circuits, and the first detection coil and the second detection coil being configured symmetrical with each other in terms of the magnetic circuits, the inspection device comprising: a first input unit to which a signal is input from the first detection coil;

a second input unit to which a signal is input from the second detection coil;

a difference calculating unit that calculates the difference between a first signal from the first input unit and a second signal from the second input unit;

a signal processing unit that processes a difference signal calculated by the difference calculating unit; and an oscillation unit that generates an excitation signal for the excitation coil and a reference signal for the signal processing unit.

[2] The inspection device as set forth in [1], wherein the oscillation unit varies frequency in stages for oscillation.

[3] The inspection device as set forth in [1] or [2], wherein the first detection coil is magnetically connected to a reference material, the reference material, the first detection coil, and the excitation coil constituting a first magnetic circuit;

the second detection coil is magnetically connected to an object to be measured, the object to be measured, the second detection coil, and the excitation coil constituting a second magnetic circuit; and as a result of calculation performed by the difference calculating unit, the magnetic flux flowing within the first magnetic circuit and the magnetic flux flowing within the second magnetic circuit are compared.

[4] The inspection device as set forth in any one of [1] to [3] above, comprising a control unit for inputting/outputting data from/to an external unit and controlling the first input unit, the second input unit, the difference calculating unit, and the signal processing unit.

[5] A non-contact sensor, comprising; an excitation coil; a first detection coil; and a second detection coil, wherein the excitation coil, the first detection coil, and the second detection coil constitute magnetic circuits, and the first detection coil and the second detection coil are configured symmetrical with each other in terms of the magnetic circuits.

[6] The non-contact sensor as set forth in [5], wherein the first detection coil and the second detection coil are respectively disposed orthogonal to the excitation coil, and the first detection coil and the second detection coil are made up of a single coil or a plurality of coils connected in series.

[7] The non-contact sensor as set forth in [5], wherein the first detection coil and the second detection coil are disposed on the same axis with respect to the excitation coil.

[8] An inspection method, comprising: using the non-contact sensor as set forth in [5], connecting the first detection coil magnetically to a reference material;

connecting the second detection coil magnetically to an object to be measured;

inputting an excitation signal to the excitation coil; and finding a difference between a signal from the first detection coil and a signal from the second detection coil, thereby determining whether the object to be measured is different from the reference material with respect to physical properties or dimensions.

[9] The inspection method as set forth in [8], wherein the frequency of the excitation signal is varied in stages.

Advantageous Effects of Invention

According to the present invention, an inspection device and an inspection method that can judge the presence or absence of an object to be inspected, its difference from the reference standard substance, etc. highly sensitively and easily can be provided.

BRIEF DESCRIPTION OF DRAWINGS

FIG. 4(a) is a conceptual diagram, and FIG. 4(b) is perspective view.

DESCRIPTION OF THE EMBODIMENTS

The embodiment of the present invention will hereinafter be described by referring to drawings. The embodiment shown is one of the best embodiments of the present invention, and those changed as required within the scope of the present invention are included.

[Inspection System]

Figure 1:
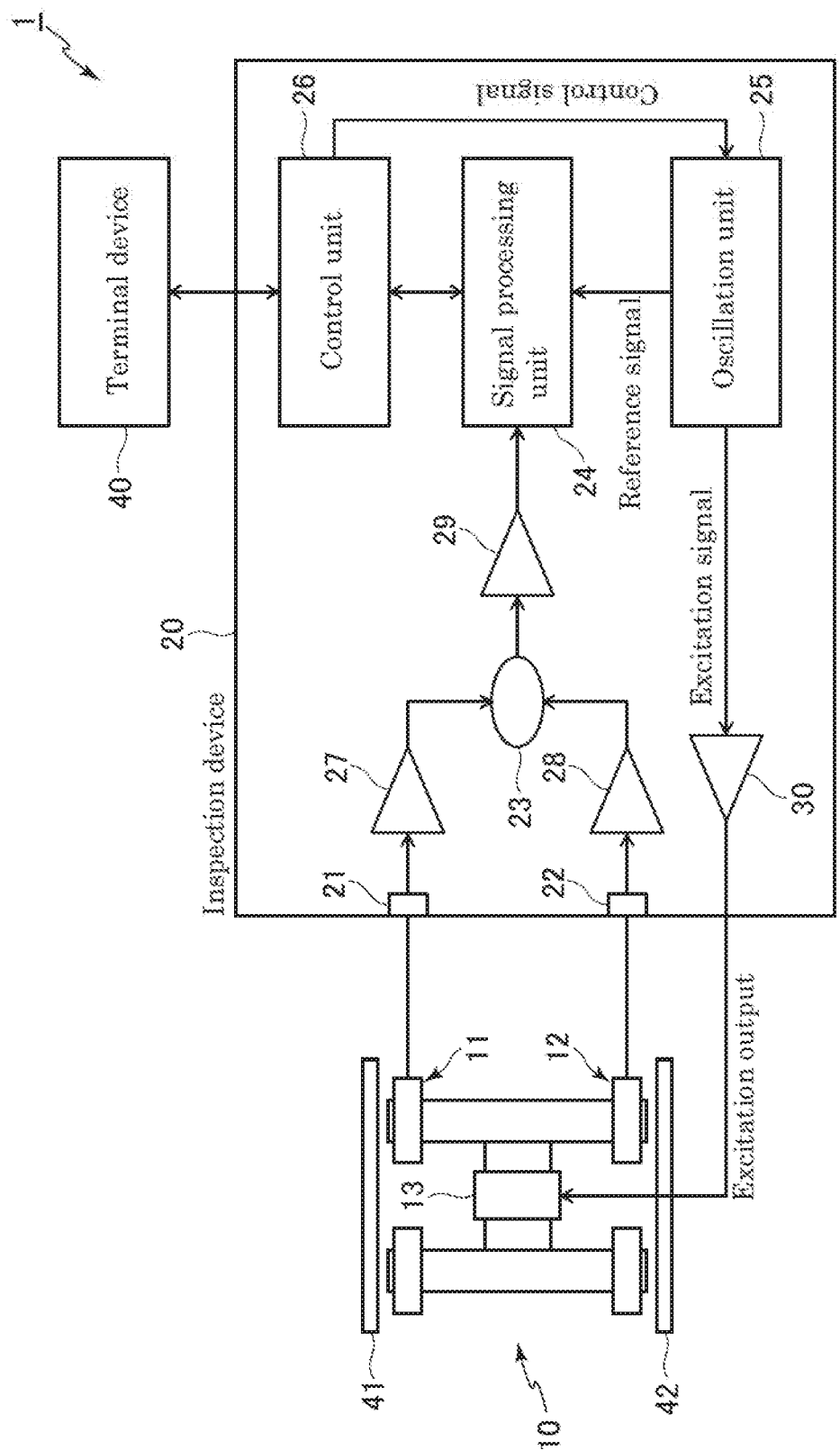
FIG. 1 is a block diagram of an inspection system according to an embodiment of the present invention.

FIG. 1 is a block diagram of an inspection system according to an embodiment of the present invention. The inspection system 1 includes: a non-contact sensor 10; an inspection system 20; and a terminal device 40 that controls the inspection device 20. The terminal device 40 is a computer that stores a specified program and performs various inputting and displaying operations. The computer includes personal computers and tablet computers.

The non-contact sensor 10 includes: a first detection coil 11; a second detection coil 12; and an excitation coil 13, and the first detection coil 11, the second detection coil 12, and the excitation coil 13 constitute magnetic circuits. In this case, it is desirable that the first detection coil 11 and the second detection coil 12 be configured, together with the excitation coil 13, so as to be symmetrical with each other in terms of the magnetic circuits. Details will be described later.

The inspection device 20 includes: a first input unit 21; a second input unit 22; a difference calculating unit 23; a signal processing unit 24; an oscillation unit 25; a control unit 26; a first amplification unit 27; a second amplification unit 28; a third amplification unit 29; and a fourth amplification unit 30.

The first input unit 21 is connected to the first detection coil 11 by wiring, a signal from the first detection coil 11 is input to the first input unit 21, and the signal is output to the first amplification unit 27. The second input unit 22 is connected to the second detection coil 12 by wiring, a signal from the second detection coil 12 is input to the second input unit 22, and the signal is output to the second amplification unit 28.

The difference calculation unit 23 calculates the difference between the signal from the first input unit 21 (also called "the first detection signal") and the signal from the second input unit 22 (also called "the second detection signal"). In the block diagram shown in FIG. 1, the first amplification unit 27 amplifies the amplitude of the signal from the first input unit 21, and the second amplification unit 28 amplifies the amplitude of the signal from the second input unit 22. Consequently, the difference between the amplified signal from the first amplification unit 27 and the amplified signal from the second amplification unit 28 is calculated, and the difference signal is amplified via the third amplification unit 29 and output to the signal processing unit 24.

The signal processing unit 24 calculates the change in difference signal input from the difference calculating unit 23 with respect to the excitation signal by using a reference signal from the oscillation unit 25. The signal processing unit 24, which has a Fourier transformation function, transforms signals on the time axis to those on the frequency axis.

The oscillation unit 25 oscillates signals of specified magnitude at a given frequency based on the control signal from the control unit 26. The signal generated by the oscillation is branched into an excitation signal and a reference signal, and the excitation signal is output to the excitation coil 13 and the reference signal is output to the signal processing unit 24 respectively. The excitation signal is amplified by the fourth amplification unit 30, and output to the excitation coil 13.

The control unit 26 inputs/outputs data and signals from/ to an external terminal device 40, and at the same time controls the first input unit 21, the second input unit 22, the difference calculating unit 23, and the signal processing unit 25. The control unit 26 adjusts the amplification factor of the first amplification unit 27 to the fourth amplification unit 30.

[Non-Contact Sensor]

Figure 2:
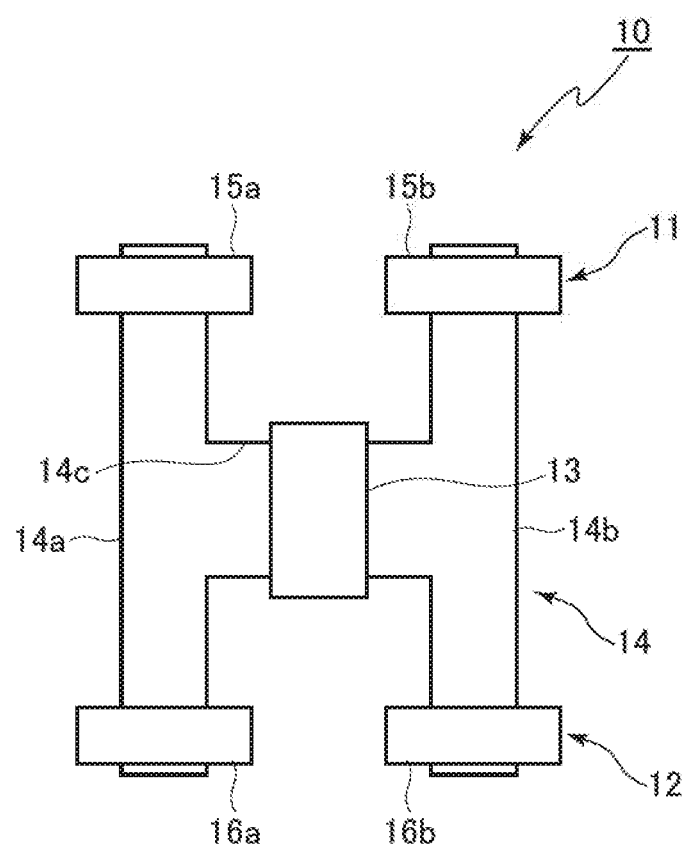
FIG. 2 is a block diagram of the non-contact sensor shown in FIG. 1.

FIG. 2 is a block diagram of the non-contact sensor 10 shown schematically in FIG. 1. The non-contact sensor 10 includes: the first detection coil 11 that is connected to the first input unit 21 by wiring; the second detection coil 12 that is connected to the second input unit 22 by wiring; and the excitation coil 13 that is connected to the fourth amplification unit 30 by wiring. The embodiment shown in FIG. 2 has an H-shaped magnetic path forming member 14. The magnetic path forming member 14 is formed, with a first magnetic path forming part 14a that extends vertically and a second magnetic path forming part 14b that extends vertically connected to both sides of a third magnetic path forming part 14c that extends horizontally. The magnetic path forming member 14 may also be formed by connecting iron rods. Since the member holds the first detection coil 11, the second detection coil 12, and the excitation coil 13, it may also be called a supporting member. Also, the magnetic path forming member 14 is made of ferrite, etc. to function as a yoke.

The first detection coil 11 will be described hereunder. Coil 15a and coil 15b are attached to the first magnetic path forming part 14a and the second magnetic path forming part 14b on one side of the position where the first magnetic path forming part 14a and the second magnetic path forming part 14b are connected to the third magnetic path forming part 14c. Specifically, the coil 15a is attached to the first magnetic path forming part 14a, the coil 15b is attached to the second magnetic path forming part 14b, and by connecting the coils 15a and 15b in series, the first detection coil 11 is configured so that the first detection coil 11, the first magnetic path forming part 14a, and the second magnetic path forming part 14b form a looped magnetic field. The coils 15a and 15b need not be connected in series but may be attached to either one of the magnetic path forming parts of the coils 15a and 15b.

The second detection coil 12 will be described hereunder. Coil 16a and coil 16b are respectively attached to the first magnetic path forming part 14a and the second magnetic path forming part 14b on the other side of the position where the first magnetic path forming part 14a and the second magnetic path forming part 14b are connected to the third magnetic path forming part 14c. Specifically, the coil 16a is attached to the first magnetic path forming part 14a, the coil 16b is attached to the second magnetic path forming part 14b, and by connecting the coils 16a and 16b in series, the second detection coil 12 is configured so that the second detection coil 12, the first magnetic path forming part 14a, and the second magnetic path forming part 14b form a looped magnetic field. The coils 16a and 16b need not be connected in series but may be attached to either one of the magnetic path forming parts of the coils 16a and 16b.

The excitation coil 13 is configured by attaching a coil to the third magnetic path forming part 14c.

It is desirable that parameters such as the shape, dimensions, thickness and the number of turns of wiring of the coils 15a and 15b, which constitute the first detection coil 11, and those of the coils 16a and 16b, which constitute the second detection coil 12, be the same, based on the inspection principle described below.

[Principle and Inspection Method Based on the Same]

Figure 3:
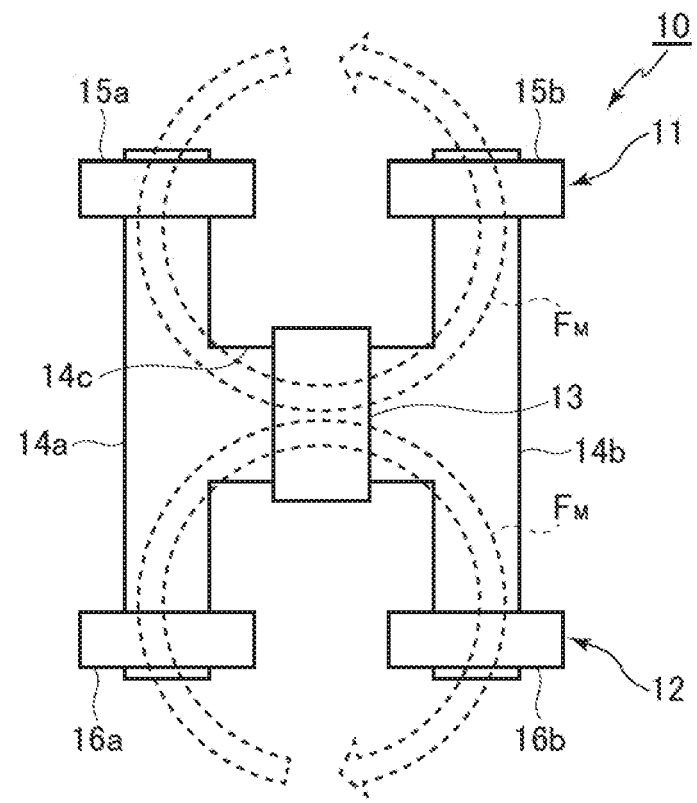
FIGS. 3(a) and 3(b) are diagrams showing the inspection principle used for the inspection system shown in FIG. 1.
Figure 3:
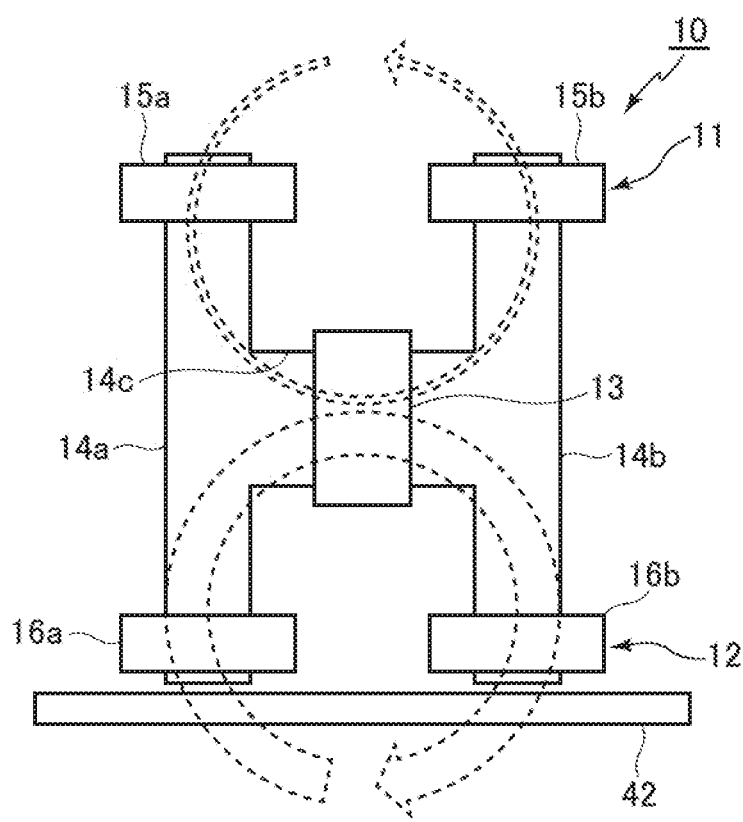

FIG. 3 shows the inspection principle FIGS. 3(a) and 3(b) show the inspection principles used the inspection system shown in FIG. 1. The magnetic circuits of the non-contact sensor 10 are formed by the first detection coil 11, the second detection coil 12, and the excitation coil 13, and the first detection coil 11 and the second detection coil 12 are configured symmetrical with each other in terms of the magnetic circuits. Specifically, the magnetic lines of force from one excitation coil 13 is branched into a magnetic lines of force $F_M$ that penetrates the first detection coil 11 and a magnetic lines of force $F_M$ that penetrates the second detection coil 12. As shown by one magnetic lines of force $F_M$, a first magnetic circuit that penetrates the excitation coil 13 and the first detection coil 11 is formed, and as shown by the other magnetic lines of forth $F_M$, a second magnetic circuit that penetrates the excitation coil 13 and the second detection coil 12 is formed.

In this case, "the first detection coil 11 and the second detection coil 12 are configured symmetrical with each other in terms of the magnetic circuits" means that the magnetic flux generated in one region is branched into two magnetic fluxes with respect to a spatially symmetrical surface, each forming a magnetic circuit, and the magnetic flux in one magnetic circuit is equal to that in the other magnetic circuit in regions symmetrical with respect to that surface. When the first detection coil 11 and the second detection coil 12 are configured symmetrical with each other in terms of the magnetic circuits, the magnetic flux flowing through the first detection coil 11 becomes equal to the magnetic flux flowing through the second detection coil 12 in the region symmetrical with respect to the surface, and the intensity of the magnetic field flowing through the first detection coil 11 becomes equal to the magnetic field flowing through the second detection coil 12, and their directions are the same. As shown by the arrow formed by dotted line in FIG. 3(a), the magnetic lines of force $F_M$ in the first magnetic circuit and that of the second magnetic circuit become the same.

Therefore, since the first detection signal becomes equal to the second detection signal in the difference calculating unit 23, the output signal from the difference calculating unit 23 becomes zero, provided that noise is ignored. Consequently, the following inspection method can be derived. If the first detection coil 11 or the second detection coil 12 is positioned at a place where a substance having physical properties, such as magnetic permeability and conductivity, different from those of air is placed, with the head of the coil facing the substance, a difference signal is output from the difference calculating unit 23 when an object exists at that place. When the output value exceeds a specified range, the presence or absence of an object can be detected preferably based on the presence or absence of output.

In the embodiment of the present invention, various detecting methods can be provided based on this detection principle.

Firstly, a magnetic object 42 is positioned toward the head of the second detection coil 12, which intensifies the magnetic field on the side of the second detection coil 12. By keeping the magnetic field generated from the excitation coil 13 constant, the magnetic field on the side of the first detection coil 11 is intensified. As shown by the arrow formed by dotted line in FIG. 3(b), the magnetic lines of force $F_M$ differs between the first magnetic circuit and the second magnetic circuit.

Suppose the signal from the first detection coil 11 and that from the second detection coil 12 to be $F_1$ and $F_2$ respectively, provided that nothing is placed, facing the first detection coil 11 and the second detection coil 12. When a magnetic object 42 is placed, facing the second detection coil 12, the signal from the first detection coil 11 is represented as $F_1-\alpha(<F_1)$, and the signal from second detection coil 12 is represented as $F_2+\beta(>F_2)$. Therefore, the difference signal from the difference calculating unit 23 is represented as $-\alpha-\beta$.

Therefore not only the change in the signal from the first detection coil 11 and that from the second detection coil 12 can be detected but also the magnetic object 42 can be detected at a sensitivity approximately twice the magnitude of the change. Since the values $\alpha$ and $\beta$ are theoretically equal, the detection by this method is supposed to have the accuracy of doubled sensitivity.

In this case, since there is only one excitation coil 13, which is shared by the first magnetic circuit on the side of the first detection coil 11 and the second magnetic circuit on the side of the second detection coil 12, such extremely high-accuracy detection is achieved by an easy method.

Provided that the first magnetic circuit on the first detection coil 11 and the second magnetic circuit on the second detection coil 12 are connected in parallel so that the change in the magnetic flux that flows through the first magnetic circuit can flow into the second magnetic circuit, and that the change in the magnetic flux that flows through the second magnetic circuit can flow into the first magnetic circuit, the excitation coil 13 need not necessarily be one.

Secondly, when an object 41 is placed so that it is magnetically connected to the first detection coil 11, and the object 42 is placed so that it is magnetically connected to the second detection coil 12, a signal is not output from the difference calculating unit 23, provided that the physical properties, such as magnetic permeability and conductivity, as well as dimensions, such as thickness, are equal.

When a reference material is placed as the object 41 and an object to be measured is placed as the object 42, it is possible to judge whether the object to be measured is the same as the reference material in respect of physical properties and/or dimensions.

Specifically, the inspection can be performed by following the procedures described below.

Firstly, a reference object 41 is respectively placed, facing the first detection coil 11 and the second detection coil 12. The excitation signal is then output toward the excitation coil 13, and the amplification factor of either one or both of the first amplification unit 27 and the second amplification unit 28 is adjusted so that the difference signal between the signal from the first detection coil 11 and that from the second detection coil 12 becomes zero. This adjustment need not necessarily be performed every time inspection is conducted.

Next, either one of the object on the side of the first detection coil 11 and that on the second detection coil 12 is replaced by the object to be inspected. The excitation signal is then input to the excitation coil 13 to determine the presence or absence of the output of the difference signal between the signal from the first detection coil 11 and that from the second detection coil 12. When a difference signal is confirmed to have been output, the object to be inspected 42 is determined to be different from the reference object 41.

The detection sensitivity of this inspection method depends on the magnetic symmetry between the first detection coil 11 and the second detection coil 12, namely mechanical and/or magnetic manufacturing accuracy and the physical similarity between the reference object and the object to be measured.

The non-contact sensor 10 shown in FIG. 2 includes the excitation coil 13, the first detection coil 11, and the second detection coil 12, which constitute magnetic circuits, with the first detection coil 11 and the second detection oil 12 disposed symmetrical with each other in terms of the magnetic circuits. Note that, as shown in FIG. 2, the first detection coil 11 is placed orthogonal to the excitation coil 13, the second detection coil 13 is placed orthogonal to the excitation coil 13, the first detection coil 11 is made of a single coil or a plurality of coils 15a, 15b connected in series, and the second detection coil is made of a single coil or a plurality of coils 16a, 16b connected in series. Consequently, with the non-contact sensor 10, detection of the difference from the reference state by the first detection coil 11 is directly reflected on the detection of difference from the reference state by the second detection coil 12.

As described above, according to the embodiment of the present invention, the presence or absence of an object to be inspected, the difference from the reference object, etc. can be judged highly sensitively and easily. In the above description, the same objects were placed on the side of the first detection coil 11 and on the side of the second detection coil 12, the excitation signal was then output to the excitation coil 13, and either one or both of the first amplification unit 27 and the second amplification unit 28 was/were adjusted so that the output from the difference calculating unit 23 became zero.

This is only an example of adjustment of the non-contact sensor 10. The following adjustment procedure is also allowed. The excitation signal is output to the excitation coil 13 in a state where nothing is placed on the side of the first detection coil 11 and on the side of the second excitation coil 12, and the output value from the difference calculating unit 23 is stored. The object to be inspected 42 is then placed on either the side of the first detection coil 11 or the side of the second detection coil 12, and the stored output value may be subtracted when the difference calculating unit 23 calculates the difference between the signal from the first detection coil 11 and that from the second detection coil 12. Or the same objects 41 are placed on both the side of the first detection coil 11 and the side of the second detection coil 12, the excitation signal is then output to the excitation coil 13, and the output value from the difference calculating unit 23 is stored. Then, the object 41 on either the side of the first detection coil 11 or the side of the second detection coil 12 is replaced by the object to be inspected 42, and the stored output value may be subtracted when the difference calculating unit 23 calculates the difference between the signal from the first detection coil 11 and the signal from the second detection coil 12.

It is also possible to adjust either one or both of the first amplification unit 27 and the second amplification unit 28, without placing the same objects on the side of the first detection coil 11 and the second detection coil 12, or the output value from the difference calculating unit 23 may be stored, and the output value may be subtracted each time the inspection is performed.

[Variations of Non-Contact Sensors]

Figure 4:
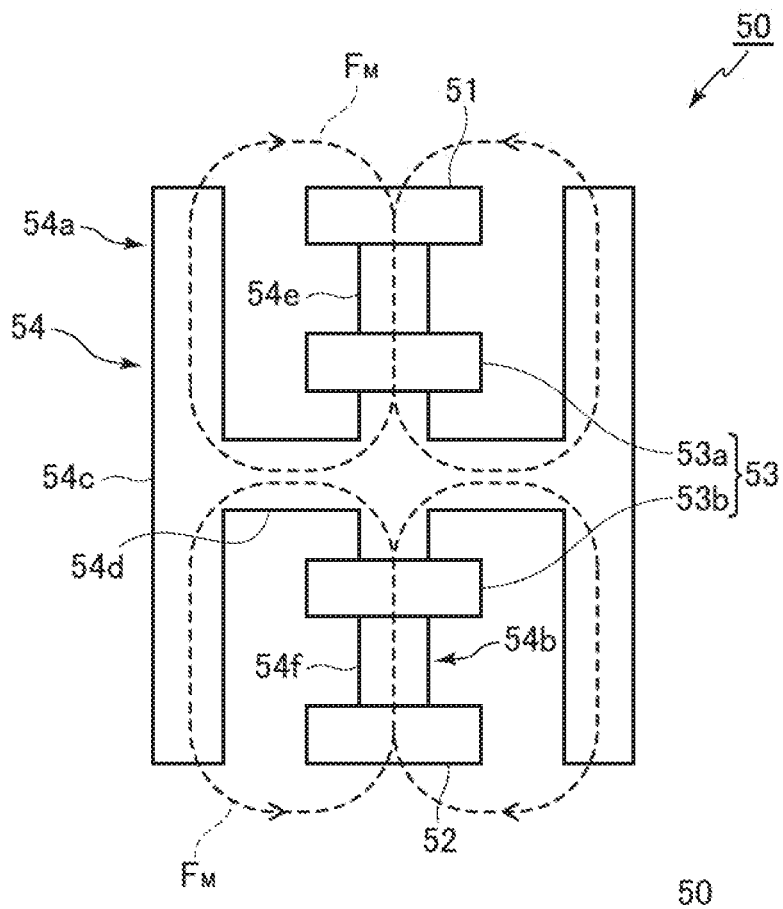
FIGS. 4(a) and 4(b) show non-contact sensors that are different from the one shown in FIG. 2, where
Figure 4:
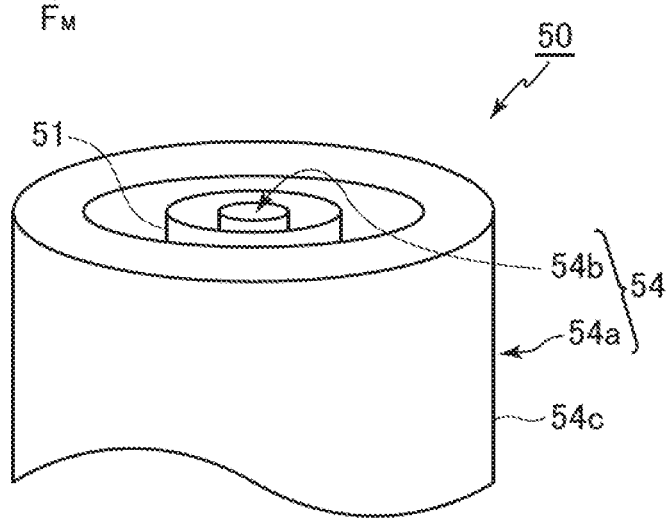

FIGS. 4(a) and 4(b) show non-contact sensors that are different from the one shown in FIG. 2, where FIG. 4(a) is a conceptual diagram, and FIG. 4(b) is a perspective view. A non-contact sensor 50 includes: a first detection sensor 51 that is connected to the first input unit 21 by wiring; a second detection sensor 52 that is connected to the second input unit by wiring; and an excitation coil 53 that is connected to the fourth amplification unit 30 by wiring.

The embodiment shown in FIGS. 4(a) and 4(b) includes a magnetic path forming member 54. The magnetic path forming member 54 includes a first magnetic path forming part 54a and a second magnetic path forming part 54b. The first magnetic path forming part 54a includes a cylindrical peripheral part 54c and disk-shaped connecting part 54d provided at equal distance from the top and the bottom edges of the peripheral part 54c. The second magnetic path forming part 54b includes axial parts 54e, 54f for mounting at upper and lower parts of the connecting part 54d. Members made of iron may be connected to form the magnetic path forming member 54, and since it holds the first detection coil 51, the second detection coil 52, and the excitation coil 53, it may be also be called supporting member. The magnetic path forming member 54 may be made of ferrite to function as the yoke.

The excitation coil 53 is formed by connecting an upper coil 53a and a lower coil 53b in series. The upper coil 53a is mounted to the axial part 54e so as to face the connecting part 54d, and the lower coil 53b is mounted to the axial part 54f so as to face the connecting part 54d. The upper coil 53a and the lower coil 53b of the excitation coil 53 are connected by winding so as to form magnetic lines of force $F_M$ as shown by the arrows formed by dotted line.

In other words, the magnetic lines of force $F_M$ from the upper coil 53a penetrates the first detection coil 51, the magnetic lines of force $F_M$ from the lower coil 53b penetrates the second detection coil 52, a first magnetic circuit is formed as shown by the magnetic lines of force $F_M$ that penetrates the upper coil 53a and the first detection coil 51, a second magnetic circuit is formed as shown by the magnetic lines of fore $F_M$ that penetrates the lower coil 53b and the second detection coil 52, the magnetic lines of force $F_M$ overlap with each other at the cylindrical connecting part 54 in the same direction and at equal magnitude in the reference state, and the first magnetic circuit and the second magnetic circuit are connected in parallel.

Consequently, even if the excitation coil 53 is made of two coils 53a, 53b, the first magnetic circuit on the side of the first detection coil 51 and the second magnetic circuit on the side of the second detection coil 52 are connected in parallel, allowing the change of the magnetic flux flowing within the first magnetic circuit to flow into the second magnetic circuit, or the change of the magnetic flux flowing within the second magnetic circuit to flow into the first magnetic circuit.

Note that the first detection coil 51 is attached to the upper axial part 54e, whereas the second detection coil 52 is attached to the lower axial part 54f. The first detection coil 51 is attached to the tip of the upper axial part 54e, whereas the second detection coil 52 is attached to the tip of the lower axial part 54f.

The non-contact sensor 50 shown in FIGS. 4(a) and 4(b) includes the excitation coil 53, the first detection coil 51, and the second detection coil 52 so as to form magnetic circuits, and the first detection coil 51 and the second detection coil 52 are configured symmetrical with each other in terms of the magnetic circuits. In particular, as shown in FIGS. 4(a) and 4(b), the first detection coil 51 and the second detection coil 52 are disposed on the same axis with respect to the excitation coil 53. Therefore, with the non-contact sensor 50, the difference detected by the first detection coil 51 is directly reflected on the detection of the difference by the detection coil 52.

Figure 5:
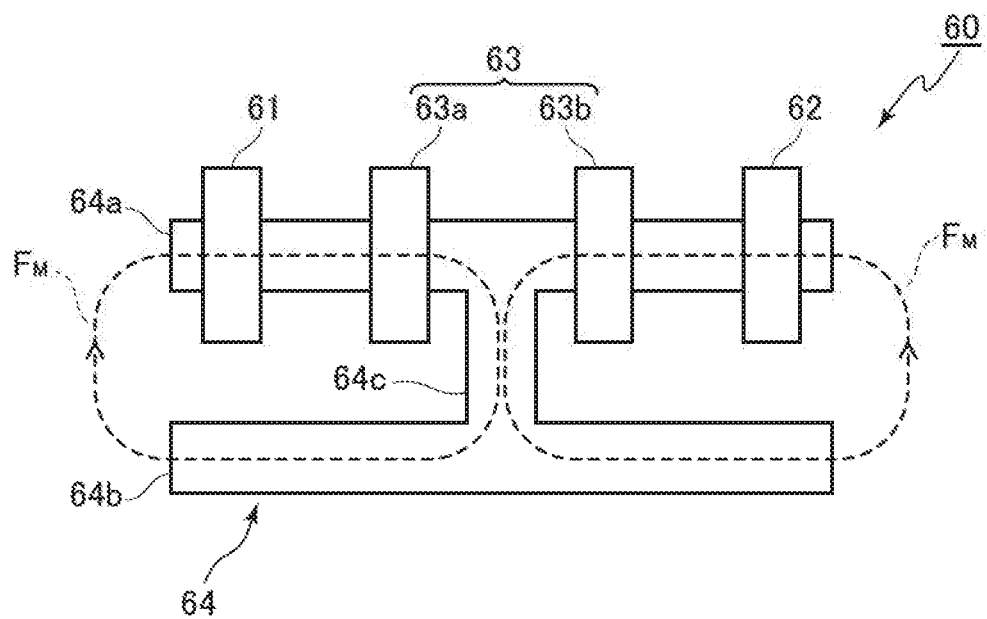
FIG. 5 is a block diagram of a on-contact sensor that is different from those shown in FIGS. 2, 4(a) and 4(b).

FIG. 5 is a block diagram of a non-contact sensor that is different from those shown in FIGS. 2, 4(a) and 4(b). The non-contact sensor 60 includes: a first detection coil 61 that is connected to the first input unit 21 by wiring; a second detection coil 62 that is connected to the second input unit 22 by wiring; and an excitation coil 63 that is connected to the fourth amplification unit 30 by wiring. The embodiment shown in FIG. 5 includes an H-shaped magnetic path forming member 64. The magnetic path forming member 64 is formed by connecting a first magnetic path forming part Ma and a second magnetic path forming part 64h that extend horizontally, which is a longitudinal direction, to both sides of a third magnetic path forming part 64c that extend vertically, which is a short direction. The magnetic path forming member 64 may be formed by connecting iron members, and since it supports the first detection coil 61, the second detection coil 62, and the excitation coil 63, it may also be called a supporting member. Also, the magnetic path forming member 64 may be made of ferrite, etc. to function as the yoke.

The first detection coil 61 is attached to the first magnetic path forming part 64a on one side with respect to the connecting position with the third magnetic path forming part 64c. The second detection coil 62 is attached to the first magnetic path forming part 64a on the other side with respect to the connecting position with the third magnetic path forming part 64c.

The excitation coil 63 is made of two coils 63a, 63b, and the coil 63a is attached to the first magnetic path forming part 64a on one side with respect to the connecting position with the third magnetic path forming part 64c. The coil 63b is attached to the magnetic path forming part 64a on the other side with respect to the connecting position with the third magnetic path forming part 64c.

Consequently, the magnetic lines of force $F_M$ from the coil 63a penetrates the first detection coil 61, the magnetic lines of force $F_M$ from the coil 63b penetrates the second detection coil 62, a first magnetic circuit is formed as shown by the magnetic lines of force $F_M$ that penetrates the coil 63a and the first detection coil 61. A second magnetic circuit is formed as shown by the magnetic lines of force $F_M$ that penetrates the coil 63b and the second detection coil 62, the magnetic lines of force $F_M$ overlap with each other at the third magnetic path forming member 64c in the same direction and at equal magnitude in the reference state, and the first magnetic circuit, and the second magnetic circuit are connected in parallel.

Therefore, even if the excitation coil 63 is made of two coils 63a, 63b, the first magnetic circuit on the side of the first detection coil 61 and the second magnetic circuit on the side of the second detection coil 62 are connected in parallel, allowing the change of the magnetic flux flowing within the first magnetic circuit to flow into the second magnetic circuit, or the change of the magnetic flux flowing within the second magnetic circuit to flow into the first magnetic circuit.

The non-contact sensor 60 shown in FIG. 5 includes the excitation coil 63, the first detection coil 61, and the second detection coil 62, all of which constitute magnetic circuits, with the first detection coil 61 and the second detection coil 62 disposed symmetrical with each other in terms of the magnetic circuits. In particular, as shown in FIG. 5, the first detection coil 61 and the second detection coil 62 are placed on the same axis with respect to the excitation coil 63, which is made of coil 63a and coil 63b, the magnetic path forming member 64 connecting the first and the second magnetic path forming members 64a, 64b, which are the longitudinal members, and the third magnetic path forming member 64c, which is the short-direction member. The coils 63a and 63b are respectively mounted to the first magnetic path forming member 64a on the side of the first detection coil 61 and on the side of the second detection coil 62 with respect to the third magnetic path forming part 64c, which is approximately orthogonal to the axis. Consequently, with the non-contact sensor 60, the detection of the difference from the reference state by the first detection coil 61 is directly reflected on the detection of the difference from the reference state by the second detection coil 62.

Figure 6:
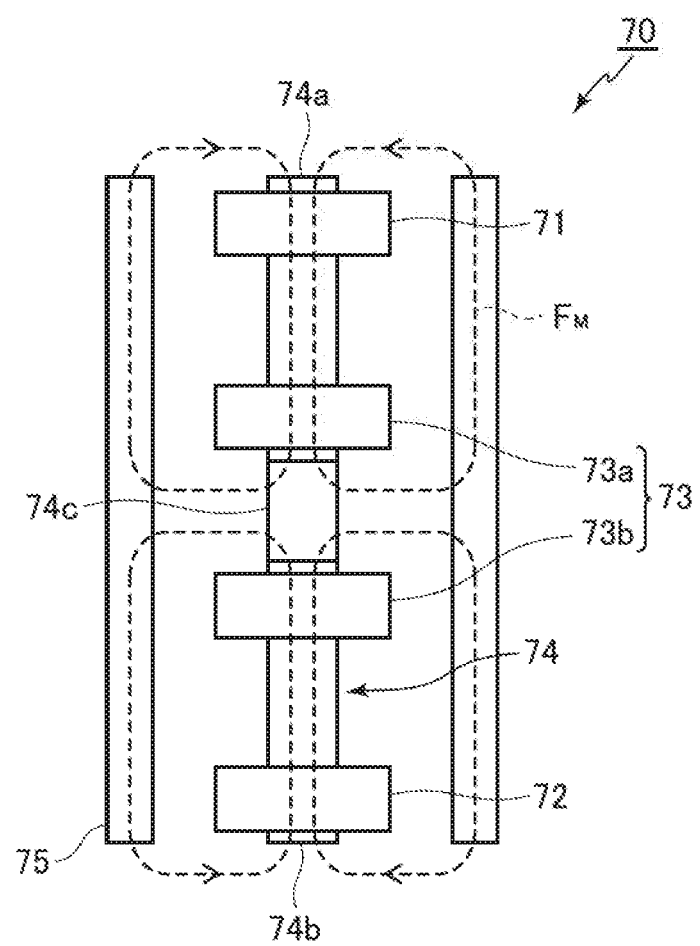
FIG. 6 is a block diagram of a non-contact sensor that is different from those shown in FIGS. 2, 4(a), 4(b) and 5.

FIG. 6 is a conceptual diagram of a non-contact sensor that is different from those shown in FIGS. 2, 4(a), 4(b) and 5. The non-contact sensor 70 includes: a first detection coil 71 that is connected to the first input unit 21 by wiring; a second detection coil 72 that is connected to the second input unit 22 by wiring; an excitation coil 73 that is connected to the fourth amplification unit 30 by wiring; and a supporting member 74 that supports the first detection coil 71, the second detection coil 72, and the excitation coil 73. The supporting member 74 is in a shape of rod in the embodiment shown in FIG. 6. The supporting member 74 may also be made by connecting iron rods. The supporting member 74 may be made of ferrite, etc. to function as the yoke.

The first detection coil 71 is mounted to one end of the supporting member 74, the second detection coil 72 is mounted to the other end of the supporting member 74, and the excitation coil 73, which is made of two coils 73a, 73b, is mounted to positions at the same distance from the both ends of the supporting member 74. The supporting member 74 includes: a first supporting part 74a that supports the coil 73a, which is part of the excitation coil 73; a second supporting part 74b that supports the coil 73b, which is the remaining part of the excitation coil 73; and a connecting part 74c that connects the first supporting part 74a and the second supporting part 74b, and at least the connecting part 74c is made of a non-magnetic material. The coils 73a and 73b are placed so as to generate magnetic fields of the same intensity, and the coils 73a and 73b are placed separately from each other along the supporting member 74. Consequently, the magnetic field generated by the coil 73a and that generated by the coil 73b do not overlap because of magnetic field repulsion. Note that the coils 73a and 73b are connected in series so as to generate magnetic fields in a direction reverse to the vertical axial direction, with the both ends of the pair of coil connected in series being connected to the fourth amplification unit 30 by wiring. Or, the both ends of the coils 73a and 73b are connected to the fourth amplification unit 30 by wiring so as to generate magnetic fields in a direction reverse to the vertical axial direction.

Therefore, the magnetic lines of force $F_M$ from the coil 73a penetrates the first detection coil 71, the magnetic lines of force $F_M$ from the coil 73b penetrates the second detection coil 72, the first magnetic circuit is formed as shown by the magnetic line of force $F_M$ that penetrates the coil 73a and the first detection coil 71. The second magnetic circuit is formed as shown by the magnetic lines of force $F_M$ that penetrates the coil 73b and the second detection coil 72, and the magnetic field distribution generated in the first magnetic circuit and that generated in the second magnetic circuit are vertically symmetrical. Also, it is desirable that a cylindrical magnetic path forming member 75 be provided, separately from the supporting member 74, and that the first detection coil 71, the second detection coil 72, and the excitation coil 73 be housed in it to prevent being affected by the external environment. The magnetic path forming member 75 is desirably made of ferrite, etc.

The non-contact sensor 70 is also symmetrical with respect to its axis, the first detection coil 72, the second detection coil 72, and the excitation coil 73 are mounted to the axis, and by decreasing the width of the axis, the high detection resolution can be obtained, which allows inspection in micro regions and that of minute objects to be performed.

The non-contact sensor 70 shown in FIG. 6 includes the excitation coil 73, the first detection coil 71, and the second detection coil 72, all of which constitute magnetic circuits, with the first detection coil 71 and the second detection coil 72 disposed symmetrical with each other in terms of the magnetic circuits. Note, in particular, that as shown in FIG. 6, the first detection coil 71 and the second detection coil 72 are disposed on the same axis with respect to the excitation coil 73. Therefore, with the non-contact sensor 70, the detection of the difference from the reference state by the first detection coil 71 is directly reflected on the detection of the difference from the reference state by the second detection coil 72. With the non-contact sensor 70, since magnetic fields are repulsive in the gap region between the coil 73a and the coil 73b, with the increase in the intensity of the magnetic field on the side of the first detection coil 71, for example, the magnetic field on the side of the second detection coil 72 is affected and decreases. Reversely, with the increase in the intensity of the magnetic field on the side of the second detection coil 72, the magnetic field on the side of the first detection coil 71 is affected and decreases. Consequently, the difference between the detection signal from the first detection coil 71 and that from the second detection coil 72 increases, improving the detection sensitivity.

[Variations of Inspection Methods]

Inspection methods are not limited to the one described above, but may be varied as described below. Signals generated from the oscillation unit 25 are made to vary in stages in a specified frequency range, from 1 kHz to 1,000 kHz for example. The signals from the substance to be measured are changed by the measurement frequency, and the state of the change varies by the substance, in general. Therefore, by examining the change in signals in as many frequencies as possible, the judgment accuracy improves. The shape, dimensions, and furthermore the positional relation between the object to be inspected and the sensor affect difference signals. However, if the shape, dimensions, and furthermore the positional relation between the object to be inspected and the sensor remain the same by the measurement, the finer difference can be determined. Also, if the size of the object to be inspected is large enough, compared to the size of the sensor, to allow the shape, dimensions, and furthermore the positional relation between the object to be inspected and the sensor to be ignored, the difference in the material of the object to be inspected can be determined regardless of the sensor position with respect to the object to be inspected.

By extracting data stored in the signal processing unit 24 from the terminal device 40, and plotting the dependency of signals output from the difference calculating unit 23 on frequency, namely the information on the amplitude and phase, which differ by the frequency of the signals, on a complex plane, the state reflecting the physical property of the object to be inspected 42 can be assessed visually. By varying the measurement frequency as described above, the change in the difference signal with respect to the excitation signal can be found as a trajectory, and not as dots, on the complex plane.

In this way, based on the difference between the signals detected by the first detection coil and those detected by the second detection coil due to physical properties (such as permeability and conductivity) of the object to be inspected 42 and the reference material 41, the highly accurate inspection can be achieved.

EXAMPLE

The non-contact sensor 10 as shown in FIGS. 3(a) and 3(b) was manufactured. Copper wires coated with polyester were wrapped around five bobbins, one of which was placed at the third magnetic path forming part 14c, of the H-shaped magnetic path forming member 14, and each of the remaining bobbins was placed at places upper and lower than the connection with the third magnetic path forming part 14e in the first magnetic path forming part 14a and the second magnetic path forming part 14b. Pure iron was used as the material for the magnetic path forming member 14. The length of the first magnetic path forming part 14a and that of the second magnetic path forming part 14b of the H-shaped magnetic path forming member 14 were set to approximately 7 cm and the distance between the center of the first magnetic path forming part 14a and that of the second magnetic path forming part 14b was set to be approximately 3.5 cm.

The oscillation unit 25 was made to collectively scan the 91 sections of the frequency range from 10 kHz to 100 kHz. The scanning interval was set to 1 kHz, and the waiting time from the start of output until the response signal from the object to be inspected stabilized was set to 10 msec.

Nothing was placed on the side of the first detection coil 11, with air regarded as the object to be measured. On the side of the second detection coil 12, a plate (100 mm H×100 mm W×3 mm T) was placed. No gap was provided between the second detection coil 12 and the plate, which was the object to be measured 42. Specifically, state with no liftoff was created.

The materials of the plate were the following six: SUS304, SUS316, brass, aluminum, copper, and iron.

Figure 7:
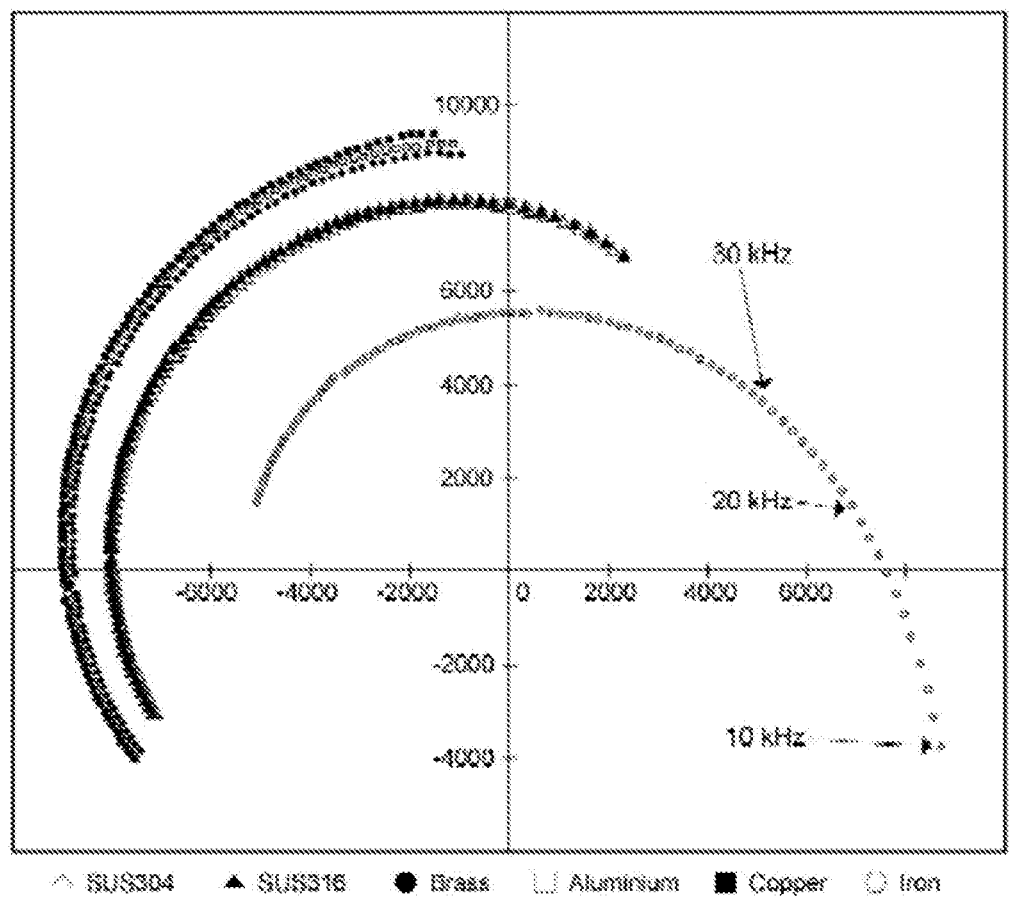
FIG. 7 is a diagram showing the result of the Example.

FIG. 7 is a chart displaying the difference signals plotted on a complex plane, with each plate positioned for the second detection coil. The horizontal axis is a real axis, and the vertical axis is an imaginary axis. As shown on FIG. 7, the difference signals vary depending on the material of the plate: SUS304 shown by the plot "Δ," SUS316 by "▲," brass by "○," aluminum by "□," copper by "■," and iron by "●." Consequently, according to the inspection method of the embodiment of the present invention, the material of the object to be measured can be determined.

When the object to be measured 42 is different from the reference material 41, the behavior of difference signals differs on the complex plane even if the dimensions are the same, which proves that the object to be measured is a material different from the reference material. Also, in this example, the frequency increased from 10 kHz to 100 kHz. Each plot in FIG. 7 is the data by the frequency. With the iron sample, as shown partially with 10 kHz, 20 kHz, and 30 kHz, the difference signal changed by the frequency. Consequently, by changing the measurement frequency, the change in the difference signal with respect to the excitation signal can be found as a trajectory and not as dots on the complex plane.

TABLE 1

|  | SUS304 | SUS316 | Brass | Aluminum | Copper | Iron |
|---|---|---|---|---|---|---|
| SUS304 |  | Δ | ○ | ○ | ○ | ○ |
| SUS316 |  |  | ○ | ○ | ○ | ○ |
| Brass |  |  |  | Δ | Δ | ○ |
| Aluminum |  |  |  |  | Δ | ○ |
| Copper |  |  |  |  |  | ○ |
| Iron |  |  |  |  |  |  |

Table 1 shows the magnitude of the possibility of estimating that the object to be inspected is a material different from the reference material, with the high possibility of being a different material marked as (○) and with the low possibility marked as (Δ). Iron can be distinguished from other materials, copper can be distinguished from materials except for aluminum, aluminum can be distinguished from materials except for copper, and SUS316 can be distinguished from materials except for SUS304. No substantial difference was found in either pair of copper, aluminum, and brass.

According to the embodiment of the present invention, due to the physical properties (such as permeability and conductivity) of the object to be inspected and the reference material, standard dimensions, etc., the signal detected by the first detection coil becomes different from the signal detected by the second detection coil, which achieves the highly accurate inspection. In particular, by analyzing the frequency response signal of the difference by changing the frequency in stages, highly sensitive inspection can be achieved even with the object to be inspected that is difficult to be determined with only a single frequency. Also, by downsizing the non-contact sensor, unitizing the inspection device, and installing an application program to an external computer, overall systematization and downsizing can be achieved.

By using the non-contact sensor and the inspection system according to the embodiment of the present invention, the entry of foreign matter, the raw material whose heat treatment has not reached the criterion, etc. can be determined instantaneously. Therefore, by installing a plurality of the non-contact sensors and the inspection systems in the line of a factory, various inspections can be performed in the mass-production process. Also, since this inspection system can detect the minute change with high sensitivity, physical quantities deriving from cracks within metals and abnormal crystallization can be monitored. Since the waveform of difference signal obtained differs from metal to metal, by analyzing the waveforms, materials can be distinguished from one another, and rusting, cracks, fatigue of metals, etc. can be estimated based on the disturbance of the waveform. By using the non-contact sensor and the inspection system according to the embodiment of the present invention, various analyses such as those described above can be performed.

REFERENCE SIGNS LIST

1: Inspection system
10: Non-contact sensor
11: First detection coil
12: Second detection coil
13: Excitation coil
14: Magnetic path forming member
14a: First magnetic path forming part
14b: Second magnetic path forming part
14c: Third magnetic path forming part
15a, 15b, 16a, 16b: Coil
20: Inspection device
21: First input unit
22: Second input unit
23: Difference calculating unit
24: Signal processing unit
25: Oscillation unit
26: Control unit
27: First amplification unit
28: Second amplification unit
29: Third amplification unit
30: Fourth amplification unit
41: Object (Reference material)
42: Object (Inspected and measured object)
50: Non-contact sensor
51: First detection sensor
52: Second detection sensor
53: Excitation coil
53a: Upper coil
53b: Lower coil
54: Magnetic path forming member
54a: First magnetic path forming part
54b: Second magnetic path forming part
54c: Outer peripheral part
54d: Connecting part
54e, 54f: Axial part
60: Non-contact sensor
61: First detection coil
62: Second detection coil
63: Excitation coil
63a, 63b: Coil
64: Magnetic path forming member
64a: First magnetic path forming part
64b: Second magnetic path forming part
64c: Third magnetic path forming part
70: Non-contact sensor
71: First detection coil
72: Second detection coil
73: Excitation coil
73a, 73b: Coil
74: Supporting member
74a: First supporting part
74b: Second supporting part 74c: Connecting part
75: Magnetic path forming member

What is claimed is:

1. An inspection device, to which a non-contact sensor is mounted,
the non-contact sensor comprising:
an excitation coil;
a first detection coil; and
a second detection coil,
the excitation coil, the first detection coil, and the second detection coil forming magnetic circuits, and
the first detection coil and the second detection coil being disposed symmetrical with each other in terms of the magnetic circuits, and
the inspection device comprising:
a first input unit to which a signal from the first detection coil is input;
a second input unit to which a signal from the second detection coil is input;
a difference calculating unit that calculates a difference signal between a first signal from the first input unit and a second signal from the second input unit;
a signal processing unit that processes the difference signal calculated by the difference calculating unit;
an oscillation unit that generates an excitation signal for the excitation coil and a reference signal for the signal processing unit;
a control unit that controls the first input unit, the second input unit, the difference calculating unit, and the signal processing unit; and
an external unit that inputs or outputs data from or to the control unit, wherein
the control unit varies frequency in stages for oscillation in a specified frequency range with a scanning interval,
calculates a change in the difference signal with respect to the excitation signal by using the reference signal with the scanning interval,
transforms the difference signal with the scanning interval on a time axis to those on a frequency axis by using the Fourier transformation, and
the external unit is configured to plot a signal on the frequency axis in a specified frequency range output from the difference calculating unit on a complex plane.

2. The inspection device as set forth in claim 1, wherein the first detection coil is connected magnetically to a reference material, the reference material, the first detection coil, and the excitation coil constituting a first magnetic circuit,
the second detection coil is connected magnetically with an object to be measured, the object to be measured, the second detection coil, and the excitation coil constituting a second magnetic circuit, and
as a result of calculation of the difference signal performed by the difference calculating unit, magnetic flux flowing within the first magnetic circuit and the magnetic flux flowing within the second magnetic circuit are compared.

3. The inspection device as set forth in claim 1, wherein the first detection coil and the second detection coil are disposed orthogonal to the excitation coil, and the first detection coil and the second detection coil are made of a single coil or of a plurality of coils connected in series.

4. The inspection device as set forth in claim 1, wherein the first detection coil and the second detection coil are disposed on the same axis with respect to the excitation coil.

5. The inspection device as set forth in claim 1, wherein the inspection device further comprises:
a first amplification unit connected between the first input unit and the difference calculating unit;
a second amplification unit connected between the second input unit and the difference calculating unit; and
a third amplification unit connected between the difference calculating unit and the signal processing unit.

6. The inspection device as set forth in claim 1, wherein the inspection device further comprises:
a first amplification unit connected between the first input unit and the difference calculating unit;
a second amplification unit connected between the second input unit and the difference calculating unit;
a third amplification unit connected between the difference calculating unit and the signal processing unit; and
a fourth amplification unit connected between the excitation coil and the oscillation unit.

7. An inspection method using an inspection device as set forth in claim 1, the inspection method comprising the steps of:
varying frequency in stages for oscillation in a specified frequency range with a scanning interval,
calculating a change in the difference signal with respect to the excitation signal by using a reference signal with the scanning interval,
transforming the difference signal with the scanning interval on a time axis to those on a frequency axis by using the Fourier transformation,
plotting a signal on the frequency axis in a specified frequency range output from the difference calculating unit on a complex plane by the external unit,
connecting the first detection coil magnetically to a reference material,
connecting the second detection coil magnetically to an object to be measured,
inputting the excitation signal to the excitation coil, and
finding a difference between the signal from the first detection coil and the signal from the second detection coil, thereby determining whether the object to be measured is different from the reference material with respect to physical properties or dimensions.

8. The inspection method as set forth in claim 7, wherein air is regarded as the object to be measured on the side of the first detection coil.

9. The inspection method as set forth in claim 7, the inspection method further comprising:
placing nothing on the side of the first detection coil and on the side of the second excitation coil or placing the same objects on the side of the first detection coil and the side of the second detection coil,
outputting the excitation signal to the excitation coil,
storing an output value from the difference calculating unit,
replacing the object on either the side of the first detection coil or the side of the second detection coil by an object to be inspected, and
subtracting the stored output value when the difference calculating unit calculates the difference between the signal from the first detection coil and the signal from the second detection coil.

10. The inspection method as set forth in claim 7, wherein the inspection device further comprises:
a first amplification unit connected between the first input unit and the difference calculating unit;
a second amplification unit connected between the second input unit and the difference calculating unit; and a third amplification unit connected between the difference calculating unit and the signal processing unit, wherein when adjusting the difference signal becoming zero, without placing the same objects on the side of the first detection coil, adjusting an amplification factor of either one or both of the first amplification unit and the second amplification unit, or storing the output value from the difference calculating unit and subtracting the stored output value each time the inspection is performed.

* * * * *